Oct. 28, 1969  W. H. PEEK ET AL  3,475,682
SHIELDED CURRENT MEASURING DEVICE
Filed July 17, 1967  2 Sheets-Sheet 1
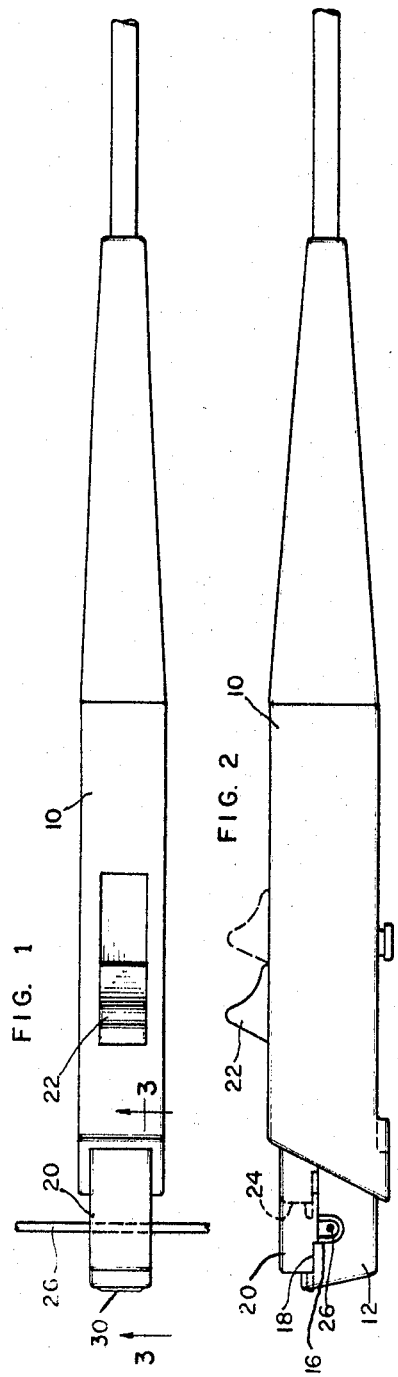
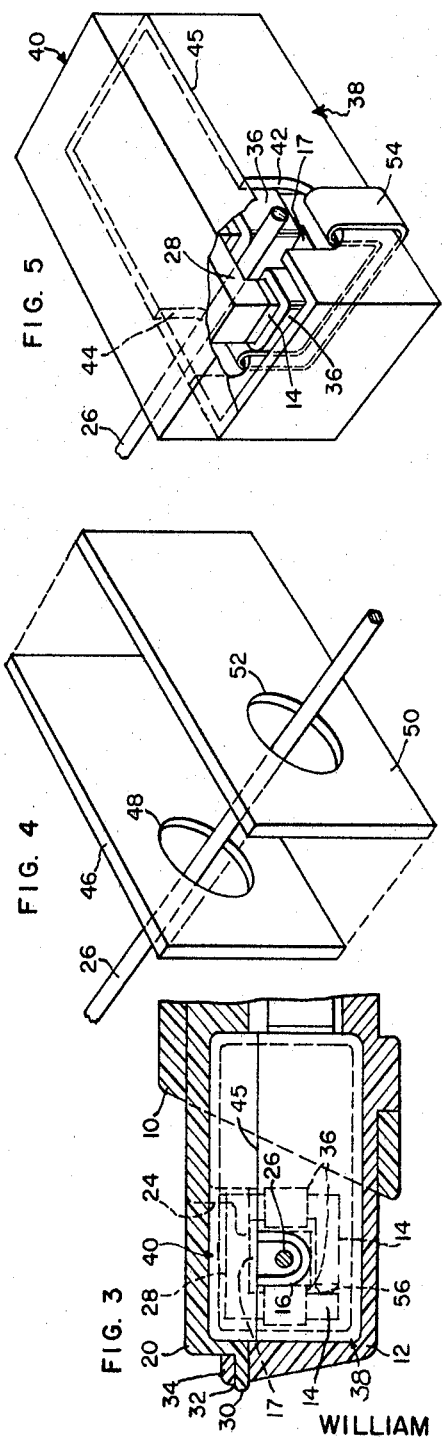
WILLIAM H. PEEK
GLENN BATEMAN
INVENTORS.
BY
BUCKHORN, BLORE, KLARQUIST & SPARKMAN
ATTORNEYS Oct. 28, 1969   W. H. PEEK ET AL   3,475,682
SHIELDED CURRENT MEASURING DEVICE
Filed July 17, 1967   2 Sheets-Sheet 2
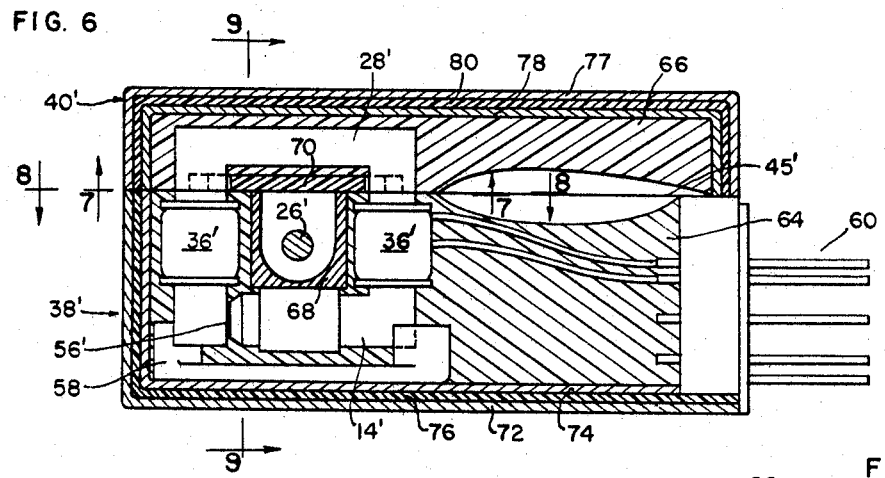
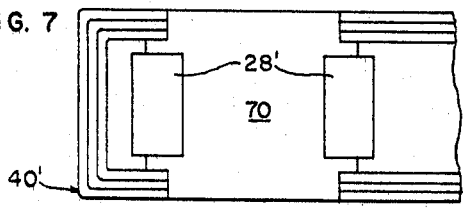
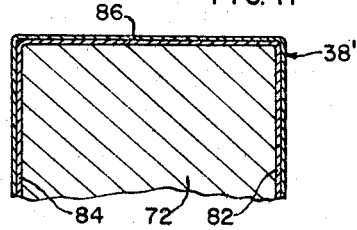
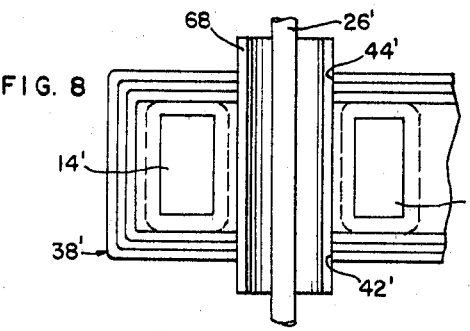
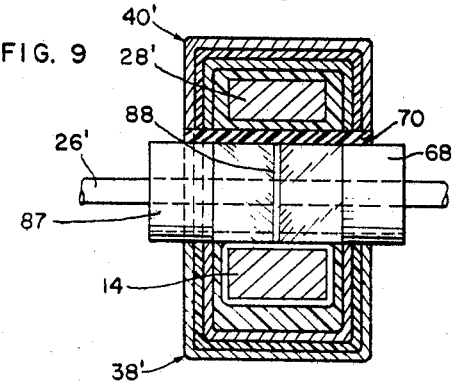
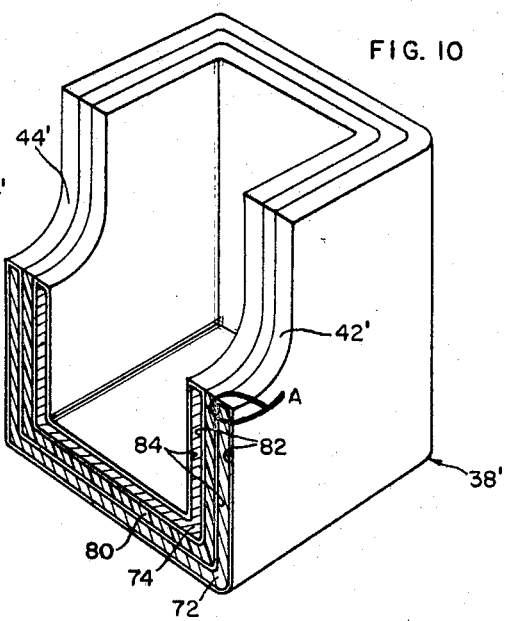
WILLIAM H. PEEK
GLENN BATEMAN
INVENTORS.
BY
BUCKHORN, BLORE, KLARQUIST & SPARKMAN
ATTORNEYS United States Patent Office
3,475,682
Patented Oct. 28, 1969

3,475,682
SHIELDED CURRENT MEASURING DEVICE
William H. Peek, Beaverton, and Glenn Bateman, Portland, Oreg., assignors to Tektronix, Inc., Beaverton, Oreg., a corporation of Oregon
Filed July 17, 1967, Ser. No. 653,762
Int. Cl. G01r 33/02
U.S. Cl. 324—127                                           11 Claims

ABSTRACT OF THE DISCLOSURE

A current probe includes a current measuring transformer having a separable core for receiving a primary conductor in which current is to be measured. A magnetic shield surrounds the transformer for protecting the transformer from extraneous flux, and this shield is provided with apertures through which the primary conductor will pass to reach the transformer core. Current in the primary conductor produces magnetic flux not only in the core of the transformer but also in the aforementioned shield tending to result in losses as well as the insertion of undesired impedance in the primary conductor circuit. However, a secondary winding means is provided according to the present invention which links such shield in the same manner as does the primary conductor, i.e. the secondary winding means links the aforementioned apertures. This winding means carries a current flowing in response to voltage induced therein by the flux in the shield and such current in turn produces a flux opposing the first mentioned flux. Losses in the shield are reduced and the insertion impedance of the shield with respect to primary conductor is also reduced.

CROSS REFERENCE TO RELATED APPLICATION

The present invention relates to a type of magnetic field measuring device as set forth and claimed in the copending application of Willem B. Velsink, Ser. No. 570,810, filed Aug. 8, 1966, and assigned to the assignee of the present invention.

BACKGROUND OF THE INVENTION

Transformers for measuring the current in a primary conductor, insertable in linking relation to the transformer's core, are subject to environmental fields due, for example, to electrical equipment located nearby. A current measuring transformer may be enclosed in a high permeability magnetic shield so that much extraneous fields will not affect the transformer's output reading. Unfortunately, the primary conductor thereby links the aforementioned shield in much the same manner as it does the transformer core and therefore a magnetic flux is induced in the shield. The flux generated in the shield is proportional to the primary conductor current, the permeability of the material in the shield and the dimensions of the shield. This flux, in turn, causes power dissipation and a temperature rise in the shield proportional to the area enclosed by the hysteresis loop of the shield material at the particular amplitude and frequency of primary conductor current. Moreover, the shield provides an insertion impedance with respect to the primary conductor which is proportional to the ratio of the rate of change of flux density in the shield to the current in the primary conductor, with the shield producing the effect of an inductive reactance and parallel resistance inserted in series with the primary conductor. Furthermore, as the flux density in the shield increases to the saturation level of the shield material, the permeability of the shield material decreases, and the insertion impedance of the shield into the primary conductor is reduced. This results in a changing insertion impedance with changes in primary conductor current amplitude.

SUMMARY OF THE INVENTION

In accordance with the present invention, a current measuring transformer or similar electrical apparatus is shielded in order to reduce or eliminate the effects of externally generated fields on such apparatus, with the shield being provided with an aperture through which a current carrying conductor passes in order to reach such transformer or other apparatus. A secondary winding means is associated with the shield for linking such shield in the same manner as the current-carrying conductor, but this winding means does not link the core of the transformer. A current flows in the secondary winding means which is proportional to a voltage induced therein by the undesired shield flux, and this current, in turn, produces a flux in the shield opposing and substantially nulling the aforementioned undesired flux whereby the losses associated therewith are reduced and the insertion impedance of the shield with respect to the primary conductor is also reduced.

In accordance with one embodiment of the present invention, a secondary winding means comprises a conductive layer or plating adhered to a shield substantially enclosing the transformer core. The shield includes apertures through which a primary conductor passes in order to reach and link such transformer core. The conductive layer also passes through these apertures and the layer further extends between such apertures both inside and outside the shield in order to complete a shorted-turn secondary linking the shield.

Also in accordance with an embodiment of the present invention, a current measuring transformer is enclosed within two shields, one inside the other, with each of the shields having a secondary winding or layer linking such shield.

It is accordingly an object of the present invention to provide an improved shielded electrical apparatus including shielding means wherein the electrical effect of such shielding means on the apparatus is reduced.

It is another object of the present invention to provide an improved shielded electrical apparatus wherein a shield thereof presents a minimized insertion impedance with respect to a conductor passing through the shield.

It is a further object of the present invention to provide an improved shielded electrical apparatus wherein losses and increases in temperature attributable to current linking such shield are substantially reduced.

It is a further object of the present invention to provide an improved shielded current probe for selectively engaging a current-carrying conductor wherein the effect of shielding is minimized both with regard to shield losses and insertion impedance of the shield with respect to the conductor.

DRAWINGS

FIG. 1 is a top view of a current probe according to the present invention;
FIG. 2 is an elevational view of the FIG. 1 device;
FIG. 3 is a cross section of the FIG. 1 current probe illustrating operation thereof;
FIG. 4 is a diagrammatic representation of the shield employed in a current probe;
FIG. 5 is a partial cut-away perspective drawing diagrammatically illustrating a current probe current measuring transformer enclosed in a magnetic shield;
FIG. 6 is an elevational cross section of a shielded current measuring transformer wherein an enclosing shield is illustrated as carrying separable parts of the transformer core;

FIG. 7 is a view taken at 7—7 in FIG. 6 illustrating an upper separable portion of the FIG. 6 device;

FIG. 8 is a view taken at 8—8 in FIG. 6 illustrating a lower separable portion of the FIG. 6 device;

FIG. 9 is a cross section taken at 9—9 in FIG. 6;

FIG. 10 is an enlarged explanatory view, partially in cross section, illustrating current measuring transformer lower fixed shield portions provided with outer conductive layers, and FIG. 11 is an enlarged view of a portion of the FIG. 10 shields, magnifying the section at A in FIG. 10.

DETAILED DESCRIPTION

Referring to FIGS. 1 through 3 illustrating a current probe according to the present invention, such current probe includes an elongated main body 10 supporting a fixed member 12 extending from a forward end of the body 10. Fixed member 12, which may be formed of plastic, is cup-shaped to receive a current measuring transformer fixed core portion 14 therein. Fixed member 12 is also provided with a pair of opposite side apertures or slots 16 which are aligned with each other and with aperture 17 in the current measuring transformer core, the slots 16 extending to the upper edge 18 of the fixed member 12. A movable member 20 is longitudinally slidable with respect to fixed member 12 and can be manipulated by means of handle 22 so that movable member 20 may be withdrawn into the position indicated at 24 providing access to slots 16 and lower fixed core portion 14. For example, a current carrying conductor 26 may then be inserted as illustrated. The movable member 20 carries therewith the upper movable core portion 28 of the current measuring transformer, and with the movable member 20 in its farthest outward position, movable member 20 locates movable core portion 28 in juxtaposition with fixed core portion 14 such that a complete magnetic circuit is established around conductor 26 with the conductor residing in core aperture 17. Movable portion 20 is desirably spring-loaded (by means not shown) so that movable portion 20 is normally closed as indicated, and also movable portion 20 is provided with a lower lip 30 which extends through aperture 32 in fixed member 12 in the closed position. Fixed member 12 protrudes just above such aperture as indicated at 34 to provide a stop for outward movement of movable member 20.

The current measuring transformer core is provided with a secondary winding 36 and may also be provided with other means for detecting magnetic flux in such core such as Hall device 56 employed, e.g., for measuring a D.C. component of flux. A current measuring transformer including a Hall device is set forth and claimed in the aforementioned copending application, Ser. No. 570,810. When a current flows in conductor 26 a magnetomotive force produces flux in the core, and this flux in turn, links the winding 36 and passes through the Hall device. Change in flux linking winding 36, for example, induces a measurable voltage in winding 36, in a manner well understood by those skilled in the art. This voltage may provide the input for an oscilloscope or other measuring instrument.

The current measuring transformer magnetic core including core portions 14 and 28 may be subject to the magnetic fields in the vicinity of the probe which would produce unwanted flux in the transformer core, affecting the accuracy of the measurements made with the probe. For this reason, the magnetic core is suitably enclosed in a magnetic shield including a fixed portion 38 carried by fixed member 12 and a movable portion 40 carried by movable member 20. When the movable member 20 is in closed position, the shield substantially completely surrounds the magnetic core. This shield essentially provides an interior body just inside the probe's fixed and movable members, broken only by apertures or slots 42 and 44 aligned with slots 16 through which conductor 26 may pass. (See FIG. 5.) The core portions are separable along edge 45 with the shield portions. Each of the slots 42 and 44, which both may be provided in lower fixed shield portion 38, extend to the edge 45 between the shield portions so that conductor 26 may be easily inserted. The magnetic shield is formed of high permeability magnetic material, Mumetal in the case of the present embodiment, acting to provide a path for stray magnetic fields in the vicinity of the probe. Therefore, such fields do not reach the core of the current measuring transformer inasmuch as the fields are diverted. Therefore the effect of stray fields on the probe's output is minimized.

Unfortunately, the presence of the shield produces a deleterious effect with respect to the current to be measured in conductor 26. The effect of the shields on conductor 26 may be considered with the aid of the diagrammatic illustration of FIG. 4. Here, a first shield side portion 46, provided with an aperture 48, links conductor 26, and similarly, shield side portion 50, provided with an aperture 52, also links conductor 26. It will be recognized that the two side portions 46 and 50 form high permeability toroids around conductor 26, and magnetic flux will be produced in these side portions in substantially the same manner as magnetic flux is induced in the core of the current measuring transformer. Of course, this flux is not limited to the side portions of the shield, but will extend also to the top, bottom and end portions illustrated by dotted lines in FIG. 4. The flux causes power dissipation and a temperature rise in the shield which is proportional to the area enclosed by the B–H loop of the shield material at that particular amplitude and frequency. The temperature rise can be excessive or intolerable, especially if other heat producing elements are also contained within such probe, such as, for example, Hall device 56. Moreover, the shield produces an insertion impedance with respect to conductor 26 of the type that would be produced by a coil having inductance and resistance, such coil being wound on a magnetic core and connected in series with conductor 26. The insertion impedance of the shield into the primary conductor 26 is proportional to the ratio of the rate of change of flux density in the shield to the current in conductor 26. Furthermore, as the flux density in the shield increases to the magnetic saturation level for the shield material, the permeability of the shield material decreases, and the insertion impedance of the shield into the conductor 26 is reduced. This causes a changing insertion impedance with changes in the amplitude of the current in conductor 26.

According to the present invention, the foregoing problems of heat generation and insertion impedance are alleviated by the provision of a low resistance secondary winding means associated with the magnetic shield surrounding the current measuring transformer. This secondary winding means suitably comprises a single shorted turn linking the same apertures of the shield that are linked by the conductor 26. Such a shorted secondary means in the form of a conductive copper strap 54 is shown in the diagrammatic illustration of FIG. 5. This copper strap extends between slots 42 and 44, both on the inside of the shield portion 38 and on the outside of shield portion 38. It also completes the circuit through the aforementioned slots 42 and 44. The strap, however, does not link the core of the current measuring transformer, and therefore does not affect the operation thereof to produce a measurable output. The shorted turn secondary winding means acts in the same manner as the shorted secondary of a transformer, and reflects such short circuit into the primary comprising conductor 26. Thus, the insertion impedance represented by the shield is reduced substantially to that of a short circuit.

The secondary winding means operates in the following manner. The secondary winding means, comprising strap 54, has a voltage induced therein by flux in the shield which voltage produces a current flow in the strap. The current flow is in a direction to produce a counter-flux opposing the flux in the shield produced by current in conductor 26. The result is a substantial nulling of the original flux whereby the net flux in the shield is materially reduced. Therefore, the associated power dissipation and temperature rise in the shield resulting from the original flux are reduced substantially. The reduced flux density in the shield also leads to a low insertion impedance with respect to conductor 26 which is low since the reduced flux density does not produce flux saturation in the shield.

Instead of comprising a shorted turn or strap, such as illustrated in FIG. 5, the secondary winding means may constitute a conductive layer or coating provided both on the inside and outside of the shield and extending through the shield apertures in the same manner as the aforementioned strap. A more detailed view of a probe shield having a secondary winding means of the conductive layer type is illustrated in FIGS. 6 through 11, wherein similar elements are referred to with primed reference numerals. The magnetic core of the device includes a lower fixed portion 14' carried in lower shield portion 38' and an upper movable core portion 28' carried in movable upper shield portion 40'. The shield portions substantially enclose the magnetic core except for slots 42' and 44' in lower shield portion 38' aligned with a central aperture in the magnetic core. The lower fixed shield portion 38' of the present device is adapted to be received in fixed member 12 of the probe illustrated in FIGS. 1, 2, and 3, while movable shield portion 40' is similarly adapted to be received within movable member 20 of the probe for slidable movement with respect thereto so that a conductor 26' may be received in linking relation to the magnetic core. Lower core portion 14' is supported on a plastic spacer 58 within shield portion 38' and further includes a Hall device 56' serially disposed in the magnetic circuit and connected by means not shown to one of the terminals 60 at the end of shield portion 38'. Similarly, winding 36' is wound upon core portion 14' and is connected to other of the terminals indicated at 60.

The lower core portion 14' including winding 36' and Hall device 56' is also supported in plastic resin 64 so that lower core portion 14' accurately matches and is slidable with respect to movable upper core portion 18' along edge 45'. Upper movable core portion 28' is similarly embedded in plastic resin 66 in the upper movable shield portion. The edges of the matching core portions may be lapped to accurately meet along edge 45' when they are slid together.

An insulated bushing 68 formed of plastic is supported within the aperture of a magnetic core and specifically within lower core portion 14' between and extending through apertures 42' and 44'. This bushing is U-shaped in cross section as illustrated in FIG. 6, and is open at the top for the reception of conductor 26'. The purpose of bushing 68 is to provide insulation between conductor 26' and the winding and core as well as between the conductor and the shield disposed around the core. The upper edges of the bushing are aligned with the upper faces of core portion 14' along edge 45'. A plastic insert 70 is also provided for the upper member adapted for sliding juxtaposition with respect to bushing 68 when the fixed and movable members are in the position shown whereby a complete insulated passage for conductor 26' is formed. Plastic insert 70 is joined to the upper shield member 40' and is aligned with the faces of upper core portion 28' along edge 45'. According to this embodiment, a pair of magnetic shields is employed, one inside the other, rather than one shield. In practice it has been found that materially improved shielding is attained inasmuch as the magnetic fields tend to be constrained within the outer shield, but any remaining flux will be substantially entirely separated from the enclosed transformer by the second shield inside the first. Thus, according to the present embodiment, lower shield portion 38' comprises an outer wall 72, suitably formed of a high permeability material such as Mumetal, and an inner wall 74 is also formed of a high permeable material such as Mumetal, separated from the outer wall by means of an intermediate plastic layer 76. Similarly, upper movable shield portion 40' suitably comprises outer wall 77 formed of a highly permeable material such as Mumetal and a similar inner wall 78 separated from the outer wall by means of plastic layer 80. The inner and outer walls on the fixed core portion respectively match the inner and outer walls on the movable core portion when the two are in closed juxtaposition as shown.

As illustrated in greater detail in FIGS. 10 and 11, both the inner and outer walls 72 and 74 are provided with conductive coatings for forming a secondary winding means with respect to lower fixed shield portion 38'. Each is provided with an outer coating 82 and an inner coating 84 joined by respective coatings extending through the apertures 42' and 44'. Thus the coatings link the apertures through which conductor 26' will extend, but the conductive coatings avoid the linking of the magnetic core located within the shield. Each of the conductive coatings provides a shorted turn for walls 72 and 74 in substantially the same manner electrically as strap 54 in FIG. 5. However, the coatings, since they substantially cover and enclose the shield walls, have an even lower resistance than strap 54 and provide a more effective linking of the magnetic circuit constituting the shield walls. Moreover, the coatings are easier to form than a conductive strap. Thus, the shield walls can be plated by immersion in a copper bath or the like so as to provide the conductive coating on the inside and outside thereof as well as through apertures 42' and 44'. The conductive secondary means is formed thereby in a simple operation. As illustrated in FIG. 11, magnifying the cross section at A in FIG. 10, a protective layer formed of cadmium or the like may then be provided over the copper layer so as to protect the copper plated Mumetal shield portions.

Although the conductive coating is illustrated only with respect to lower shield portion 38', it will be appreciated that a similar conductive coating may be provided on each of the inner and outer walls 76 and 78 of upper movable shield portion 40'. However, it has not been found necessary to provide a conductive coating in this manner for both the upper and lower shield portions inasmuch as conductive plating of the lower shield portion alone provides the desired short circuited secondary means. Moreover, although it has been found highly desirable to provide inner and outer shield walls as shown, it is readily apparent that a single shield plated with conductive material may be alternatively employed.

In order to provide electrostatic shielding between conductor 26' and the core and winding 36', the outside of bushing 68 is provided with a conductive copper coating applied thereto as indicated at 87 in FIG. 9. This conductive coating is broken as indicated at 88 so that a short circuited turn is not formed through the transformer core between bushing 68 and the conductive shield coatings. It is understood that such short circuit linking the core would be contrary to the purposes of the device inasmuch as an output is desired from winding 36' and Hall device 56' for measuring alternating and direct current in conductor 26' as further described and claimed in the above referred to copending application of Willem B. Velsink, Ser. No. 570,810.

Although the present invention has been described with respect to a current probe adapted for connection with a measuring device for the detection of currents in connected conductors, the shielding means according to the present invention is adaptable to other apparatus where in shielding is employed, and wherein a conductor for connecting the apparatus must essentially pass through the shield. A short-circuited secondary means associated with such shield then reduces the loss in the shield and its insertion impedance with respect to the conductor passing therethrough. The shield may alternatively be disposed on one side of the apparatus with the conductor passing therethrough, or it may surround the apparatus, the latter being preferred.

We claim:

1. In a current measuring transformer having a magnetic core with an aperture for receiving a current-carrying conductor in linking relation to said core, and having means cooperating with said core for detecting said current through the detection of flux in said core produced by said current, said current measuring transformer being provided with a magnetic shield for shielding said core from stray fields, said shield having an aperture for providing passage of said conductor through said shield and through said core, the current in said conductor producing a magnetic flux in said shield, the improvement comprising a secondary winding means on said magnetic shield, said secondary winding means passing through the aperture in said shield for linking said shield without linking said magnetic core, wherein said secondary winding means is adapted to carry a current in response to the voltage induced in said secondary winding means by said flux in said shield, said current in said secondary winding means acting to produce a substantially opposing flux in said shield to reduce substantially said first mentioned flux and reduce the insertion impedance of said shield with respect to said conductor.

2. The apparatus according to claim 1 wherein said secondary winding means comprises a short circuited turn linking said shield through the aperture in said shield without linking said core.

3. The apparatus according to claim 1 wherein said shield substantially encloses at least an appreciable portion of said core including wall members on either side of said core, a first of the side wall members including the said aperture in said shield for providing passage of said conductor, the second wall member including a similar aperture for also providing passage of said conductor, said secondary winding means passing through said aperture in the second of said wall members as well as through the aperture in the first of said wall members for linking said shield in substantially the same manner as said conductor.

4. The apparatus according to claim 3 wherein said secondary winding means comprises a short circuited turn linking both said apertures extending between said apertures on the inside of said shield as well as between said apertures on the outside of said shield.

5. The apparatus according to claim 3 wherein said secondary winding means comprises a conductive layer on said shield extending at least between said apertures upon the inside and outside of at least a portion of said shield and through both said apertures.

6. The apparatus according to claim 3 further provided with a second shield spaced outside and surrounding said first mentioned shield, said second shield having apertures aligned relative to the apertures of the first mentioned shield, with secondary winding means linking both the apertures in said second shield.

7. The apparatus according to claim 5 wherein a second shield is spaced outside and surrounds said first mentioned shield, said second shield having apertures aligned with the apertures of the first mentioned shield and also being provided with a secondary winding means linking both the apertures in said second shield without linking said core, said secondary winding means associated with said second shield comprising a conductive layer on said second shield extending inside and outside said second shield and through both said apertures, and non-magnetic spacer means between said first mentioned shield and said second shield.

8. A probe for measuring currents in a conductor comprising a fixed member and a separable movable member for forming an enclosure with said fixed member, said movable member having an open and a closed position with respect to said fixed member, a magnetic core including a fixed portion carried by said fixed member and a movable portion carried by said movable member, the movable portion being positioned on said movable member such that said movable portion may be selectively moved by means of said movable member into closed juxtaposition with said fixed portion for linking the said conductor therebetween as well as into open position for insertion and removal of said conductor, magnetic shield portions carried by said fixed member and said movable member for substantially surrounding said magnetic core, at least one of said shield portions being provided with apertures substantially aligned with and on either side of said magnetic core, both said apertures extending to an edge of a shield portion adjacent the remaining shield portion so that said conductor may be inserted through said apertures with said members separated, at least one of said shield portions having a substantially short circuited winding means extending between said apertures both inside and outside said one of said shield portions for linking said apertures in the same manner as said conductor but without linking said core to reduce the flux in said shield portions as well as to reduce the insertion impedance of said shield portions with respect to said conductor.

9. The apparatus according to claim 8 wherein said fixed and movable members are slidable with respect to one another for insertion of said conductor through said apertures in linking relation with said core.

10. The apparatus according to claim 8 wherein said short circuited winding means comprises a conductive layer upon at least said one of said shield portions, said conductive layer extending inside and outside said shield and linking both of said apertures.

11. The probe according to claim 8 wherein said core is provided with a winding wound thereon and a Hall device disposed across a cross-section thereof, wherein said winding provides a current indicative of alternating components of current in said conductor while said Hall device is sensitive to direct current flowing in said conductor.

References Cited

UNITED STATES PATENTS

| | | | |
|---|---|---|---|
| 2,864,963 | 12/1958 | Dornstreich et al. | 336—84 X |
| 2,933,551 | 4/1960 | Kramer | 336—84 X |
| 3,292,127 | 12/1966 | Dormaier | 336—84 |

FOREIGN PATENTS

| | | |
|---|---|---|
| 265,966 | 9/1927 | Great Britain. |

OTHER REFERENCES

Frei et al.: "Clip-On Milliammeter Uses Magnetic Amplifier," Electronics January 1957, pp. 204, 206, 208, 210, 212 and 214. Copy in Class 324—127.

RUDOLPH V. ROLINEC, Primary Examiner

A. E. SMITH, Assistant Examiner

U.S. Cl. X.R.

174—35; 336—84

FO-1050
(5/69)

UNITED STATES PATENT OFFICE
CERTIFICATE OF CORRECTION

Patent No. 3,475,682       Dated October 28, 1969

Inventor(s) WILLIAM H. PEEK et al

It is certified that error appears in the above-identified patent and that said Letters Patent are hereby corrected as shown below:

Column 1, line 51, "much" should be --such--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents